United States Patent [19]
Greene et al.

[11] Patent Number: 6,033,206
[45] Date of Patent: Mar. 7, 2000

[54] APPARATUS FOR PRODUCING MOLDED PLASTIC ARTICLES

[75] Inventors: Patrick T. Greene, Grosse Pointe Shores, Mich.; Enrique Aguilera, El Paso, Tex.

[73] Assignee: Sofanou Inc. of Michigan, Auburn Hills, Mich.

[21] Appl. No.: 09/036,449

[22] Filed: Mar. 6, 1998

[51] Int. Cl.$^7$ .................................................. B29C 45/22
[52] U.S. Cl. ........................... 425/570; 425/572; 425/588
[58] Field of Search .................................... 425/570, 572, 425/588; 264/572

[56] References Cited

U.S. PATENT DOCUMENTS

| | | |
|---|---|---|
| 3,538,209 | 11/1970 | Hegler . |
| 3,568,256 | 3/1971 | Johnson, Jr. . |
| 3,758,252 | 9/1973 | Kohler . |
| 4,319,872 | 3/1982 | Lupke et al. . |
| 4,325,685 | 4/1982 | Lupke et al. . |
| 4,374,079 | 2/1983 | Fouss et al. . |
| 5,002,478 | 3/1991 | Lupke . |
| 5,252,287 | 10/1993 | Fries . |
| 5,456,589 | 10/1995 | Lupke . |
| 5,494,430 | 2/1996 | Berns et al. . |
| 5,566,722 | 10/1996 | Bartholomew . |

*Primary Examiner*—Tim Heitbrink
*Attorney, Agent, or Firm*—Harness, Dickey & Pierce, PLC

[57] ABSTRACT

A method and apparatus for dividing the output flow of molten plastic from a conventional molding machine into a plurality of independent molten plastic flows to permit a plurality of plastic articles to be molded simultaneously from a single molding machine. The apparatus comprises a molding tool having a distributor member which divides the flow of molten plastic from an output port of a molding machine evenly into a pair of fluid flow bores. A pair of conventional flow nozzles are incorporated which receive the independent flow streams of molten plastic and independently charge a pair of molding cavities of a molding die generally simultaneously. The molding tool enables a more than 100% increase in the flow of molten plastic therethrough due to the reduction of back pressure seen by the molding machine and more than doubles the efficiency of the molding machine.

12 Claims, 5 Drawing Sheets

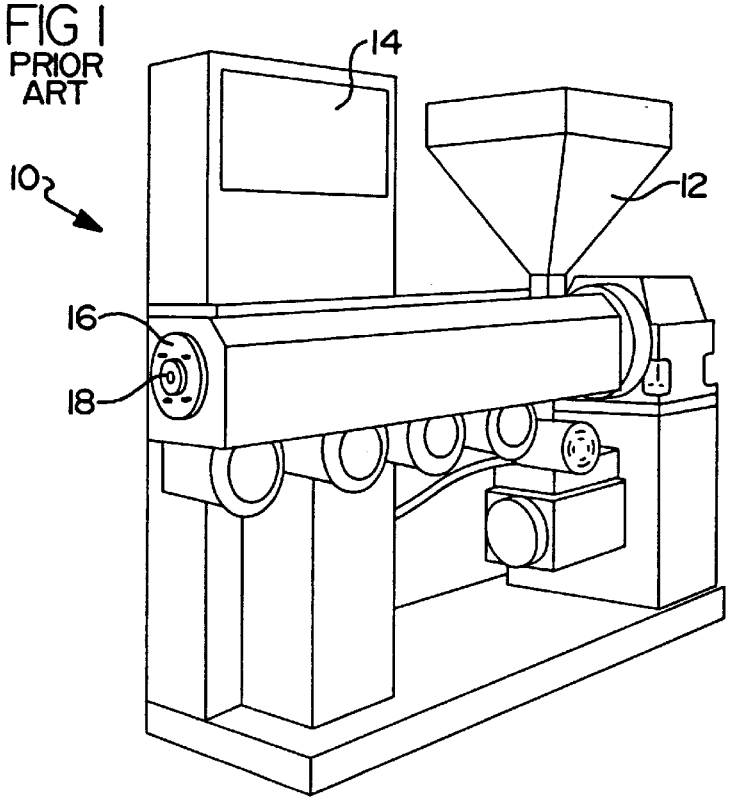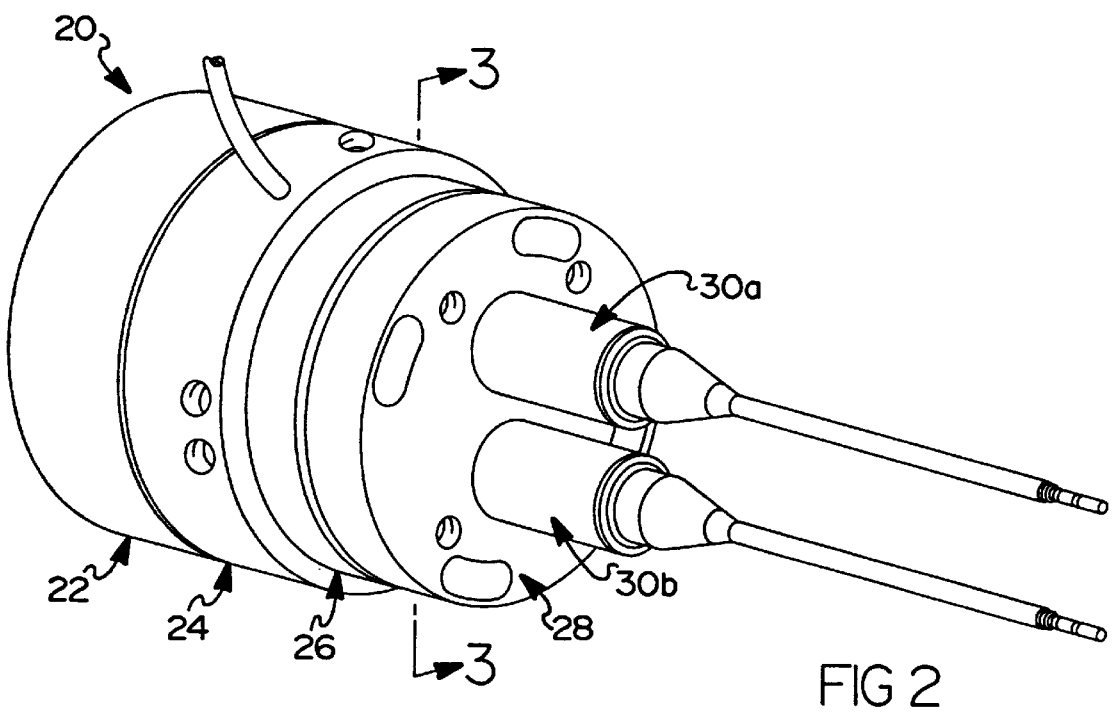

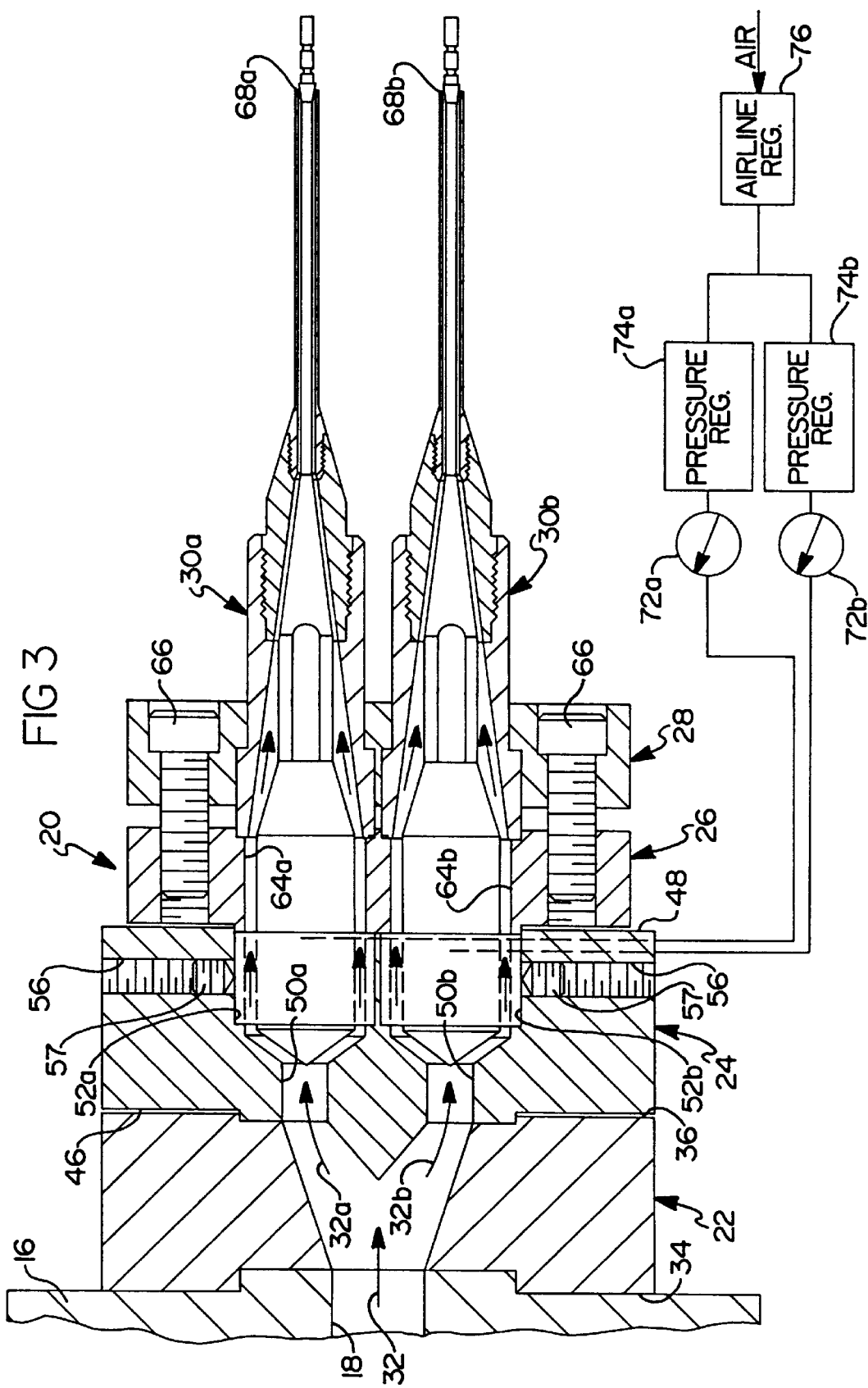

APPARATUS FOR PRODUCING MOLDED PLASTIC ARTICLES

BACKGROUND OF THE INVENTION

1. Technical Field

This invention relates to molding machines, and more particularly to a molding tool for use with a extrusion molding machine, where the molding tool receives molten plastic from an output of the molding machine and divides the molten plastic flow into a plurality of independent flow paths which are subsequently used to simultaneously produce a plurality of molded articles.

2. Discussion

Conventional molding machines often supply hot molten plastic to an output port to which is coupled a molding tool. The molding tool forms an interface between the output port and the mold into which the molten plastic is charged. With previously developed molding tools, a single stream of molten plastic is typically provided to a mold. This is accomplished by the use of a molding tool coupled to an output of the molding machine which includes a flow nozzle assembly. The flow nozzle assembly receives the full molten plastic flow and directs the flow in a precise manner into the mold. With extrusion blow molding machines, pressurized air is injected into the nozzles, as is well known in the art, to force the molten plastic against the cavities in the mold to thereby assist in the molding of articles. In vacuum molding machines a vacuum force is applied to the cavity formed by the two components of the molding die to draw the molten plastic against the surfaces of the cavity.

Until the present time, molding tools typically used with molding machines such as extrusion blow molding machines have only been capable of supplying a single molten plastic stream to the mold. Thus, the entire molten plastic output from the molding machine has typically been directed through a single flow nozzle, even though the output would be sufficient, if divided by some means or mechanism, to supply two independent molds, and therefore to permit two independent articles to be simultaneously molded using the output of the molding machine.

Accordingly, it is a principal object of the present invention to provide a means by which the molten plastic output from a molding machine can be divided into two or more independent molten plastic flows that can be used to charge two independent molding cavities simultaneously, and therefore permit a plurality of plastic articles to be molded simultaneously from the output of a single molding machine.

It is a further object of the present invention to provide a means or mechanism which is securable to an output of a conventional molding machine without modifying the molding machine, and which receives the molten plastic output from the molding machine and divides the output into two or more distinct flow paths which are subsequently used to simultaneously mold a plurality of articles.

It is another object of the present invention to provide a means or mechanism which divides the flow of molten plastic from the output of a conventional molding machine evenly into a plurality of flow paths such that each flow path may be directed through an independent flow nozzle and eventually to an independent mold tool so that a plurality of articles may be manufactured generally simultaneously.

SUMMARY OF THE INVENTION

The above and other objects are provided by a method and apparatus for producing molded articles in accordance with preferred embodiments of the present invention. In one preferred embodiment the invention comprises a molding tool which is releasably secured to an output flange of a conventional molding machine to receive the molten plastic output from the molding machine. The molding tool generally includes a coupling member, a distributor member and a plurality of conventional flow nozzles. The coupling and distributor members are secured to the output flange of the molding machine to receive the full output of molten plastic from the machine. The coupling member includes a port which directs the molten plastic from the output of the molding machine towards the distributor member. The distributor member includes a plurality of independent flow bores and a projection between the flow bores extending towards and partially into the port in the coupling member. The projection is further coaxially aligned with the bore in the coupling member such that molten plastic flowing through the bore in the coupling member is caused to be divided into a plurality of independent flow paths and directed into the flow bores in the distributor member.

The distributor member includes a corresponding plurality of recesses which communicate with the flow bores and which permit conventional fluid flow nozzles to be mounted to the distributor member. Molten plastic flowing through the flow bores in the distributor member then flows through each of the flow nozzles to produce a plurality of independent molten plastic streams which may be directed by the nozzles into independent molding cavities of one or more molding blocks to simultaneously produce a plurality of molded articles.

In the preferred embodiment the coupling member also includes a plurality of threaded bores extending generally perpendicular to the flow bores. The threaded bores are sized to accept threaded members such as set screws which are used to enable each of the flow nozzles to be precisely positioned within its associated recess. In the preferred embodiment a plurality of air supply bores are also provided in the distributor member to allow pressurized air to be injected into each of the flow nozzles, or a vacuum force developed, which is used to assist in the molding process.

The apparatus and method of the present invention does not require modification to the output flange of the molding machine nor to the flow nozzles which are typically used in the industry. The preferred embodiments are readily attachable to an output flange of a conventional molding machine, and readily accept a plurality of conventional flow nozzles to permit two or more independent molten plastic fluid flows to be created, which may then be used to independently charge a plurality of molding cavities of a molding die.

In one preferred embodiment described herein, the method and apparatus of the present invention is used to simultaneously produce a pair of continuous lengths of corrugated plastic tubing. The method and apparatus could readily be adapted, depending upon the molding dies used, to simultaneously produce a wide plurality of molded plastic articles. Still further, the method and apparatus could easily be used to simultaneously produce different components or differently sized but otherwise similar components, such as 2.0" and 4.0" diameter tubing.

The invention further provides the benefit of reducing the back pressure "seen" by the molding machine because of the plurality of flow channels provided in the distributor member. Thus, the total output of molten plastic capable of being supplied by the flow nozzles is increased, which provides for an increase in efficiency beyond that which would otherwise be expected merely from dividing the molten plastic flow into a plurality of flow channels. The present invention provides an increase in efficiency of greater than 100% when a pair of flow nozzles are used instead of a single flow nozzle.

BRIEF DESCRIPTION OF THE DRAWINGS

The various advantages of the present invention will become apparent to one skilled in the art by reading the following specification and subjoined claims and by referencing the following drawings in which:

FIG. 1 is a perspective view of a conventional extrusion molding machine;

FIG. 2 is a perspective view of a molding tool in accordance with a preferred embodiment of the present invention;

FIG. 3 is an assembled cross sectional side view of the molding tool taken in accordance with section line 3—3 in FIG. 2;

DETAILED DESCRIPTION OF THE PREFERRED EMBODIMENTS

Figure 4:
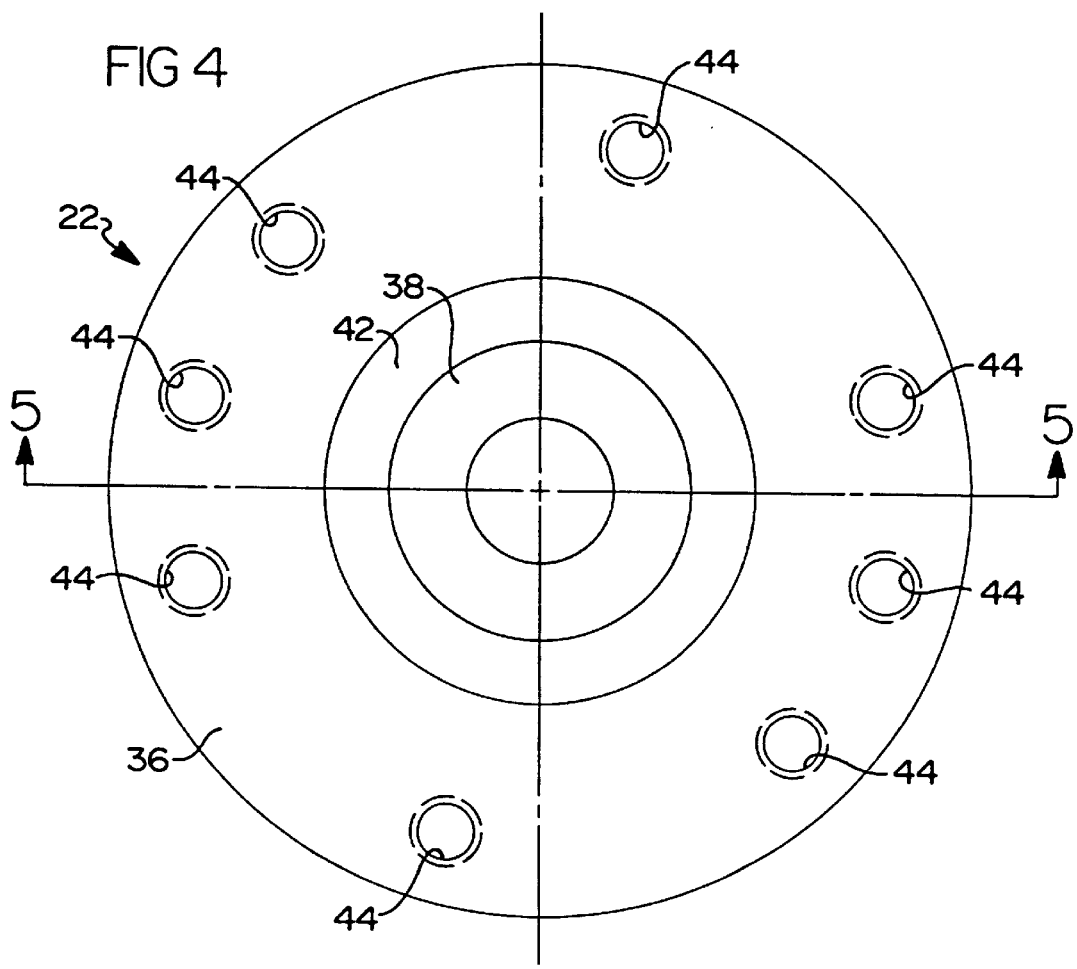
FIG. 4 is a plan view of the coupling member of the molding tool.

Referring to FIG. 1, a conventional molding machine 10 is illustrated which is suitable for use with the present invention. The molding machine 10 includes a chute 12 into which plastic pellets may be supplied, a control panel 14 and an output flange 16. The machine 10 produces hot molten plastic which is output under high pressure through an output port 18 formed in the flange 16. It will be appreciated, immediately, however that the machine 10 illustrated in FIG. 1 has been shown for exemplary purposes only and that the present invention is adapted for use with a wide variety of molding machines.

Referring to FIG. 2, a molding tool 20 in accordance with a preferred embodiment of the present invention is shown. The molding tool 20 includes a coupling member 22, a distributor member 24, a first distributor flange 26, a second distributor flange 28 and a pair of flow nozzles 30a and 30b. It will also be appreciated from the following description that more than two flow nozzles 30 could be incorporated with only minor modifications to the molding tool 20. Accordingly, the present invention is not limited to the use of merely two flow nozzles 30.

Referring to FIG. 3, the molding tool 20 is secured to the output flange 16 so as to receive the entire output of molten plastic flowing through the output port 18. The molten plastic flow path is designated by directional arrow 32. As will be described more fully in the following paragraphs, the flow path 32 is divided within the molding tool 20 into two independent molten plastic flows 32a and 32b. These two independent flows 32a and 32b are subsequently directed into independent molding cavities of a molding die to simultaneously produce a pair of plastic articles.

Figure 5:
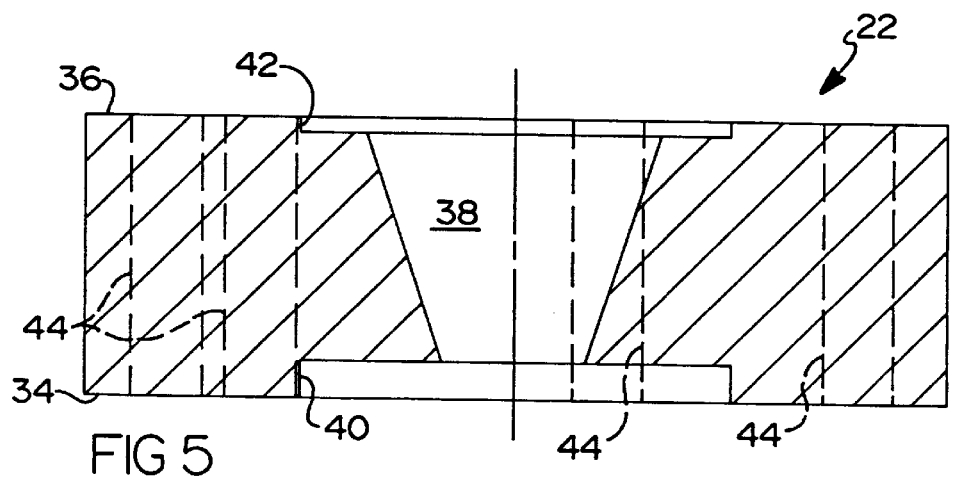
FIG. 5 is a cross sectional side view of the coupling member taken in accordance with section line 5—5 in FIG. 4.

With brief reference to FIGS. 4 and 5, the coupling member 22 is shown in greater detail. The coupling member 22 includes an inner face 34, an outer face 36 and a bore 38 extending longitudinally therethrough. A recess 40 formed on the inner face 34 accepts a portion of the output flange 16. A recess 42 formed in the outer face 36 similarly accepts a portion of the distributor member 24 when this component is coupled to the coupling member 22. The bore 38 further is tapered so as to provide a larger diameter opening from the outer face 36 side of the member 22 than from the inner face 34 side. Although this taper may vary in degree, in the preferred embodiments it comprises an angle of preferably about 16°–20°, and more preferably about 18°. Referring to FIG. 4, a plurality of threaded bores 44 are formed through which threaded bolts may be threadably inserted to secure the molding tool 20 to the output flange 16.

Figure 6:
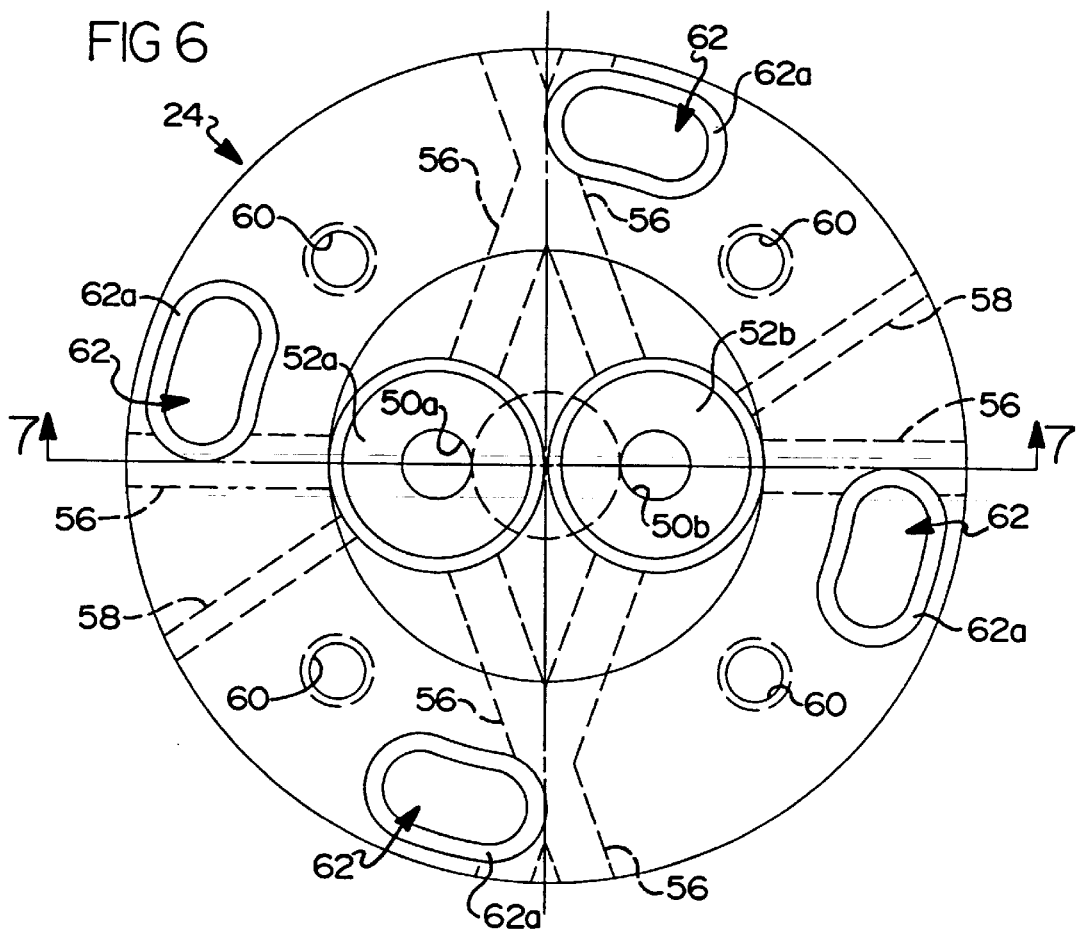
FIG. 6 is a plan view of the distributor member of the molding tool.
Figure 7:
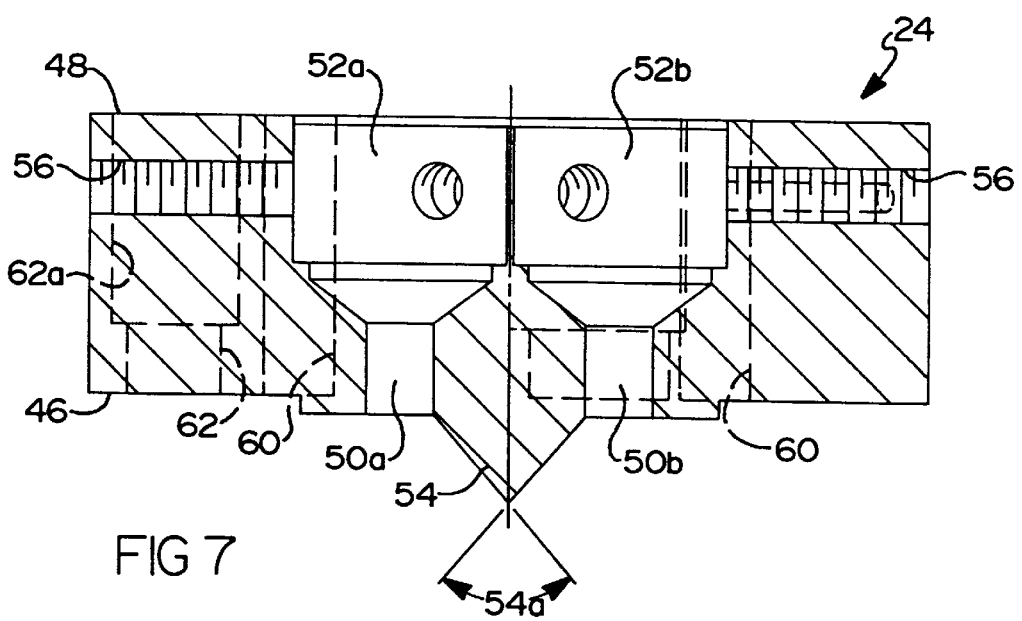
FIG. 7 is a cross sectional side view of the distributor member taken in accordance with section line 7—7 in FIG. 6.

Referring now to FIGS. 6 and 7, the distributor member 24 will be described in greater detail. With initial reference to FIG. 7, the distributor member 24 includes an inner face 46 and an outer face 48. A pair of fluid flow bores 50a and 50b are formed generally parallel to one another and each open into a recess 52a and 52b, respectively. The fluid flow bores 50a and 50b and their associated recesses 52 and 52b, respectively, form two independent fluid flow paths. The fluid flow bores 50a and 50b are further formed on opposite sides of a conical projecting portion 54 which projects from the inner face 46. The conical projecting portion 54 is further formed so as to be coaxially disposed within the bore 38 in the coupling member 22 when the distributor member 34 and coupling member 22 are secured to one another and to the output flange 16 of the molding machine 10. The angle 54a of the conical projecting portion 54 may vary considerably, but in the preferred embodiments is preferably within a range of about 70°–90°, and more preferably about 80°–82°.

With continued reference to FIG. 7, the distributor member 24 also includes a plurality of threaded alignment bores 56, which are also shown in phantom in FIG. 6. In the preferred embodiment, three such threaded alignment bores 56 are associated with each recess 52a and 52b and permit the flow nozzle 30a or 30b disposed within recesses 52a and 52b to be carefully aligned relative to these recesses via a plurality of set screws 57, shown in FIG. 3.

With specific reference to FIG. 6, the distributor member 24 further includes an air supply bore 58 associated with each recess 52a and 52b. The air supply bores 58 allow pressurized air to be supplied to the flow nozzles 30 to assist in the molding process. A plurality of threaded bores 60 are provided to permit the distributor member 24 to be secured to the coupling member 22. A plurality of slots 62, each having a recessed portion 62a (also shown in FIG. 7), are also formed for permitting threaded bolts to be inserted therethrough and used to secure the distributor member 24 and the coupling member 22 securely to the output flange 16.

With further reference to FIG. 3, the assembly of the molding tool 10 is performed by securing the distributor member 24 against the coupling member 22 as shown in FIG. 3. Each of the flow nozzles 30 is then inserted into its associated recess 52 and the first distributor flange 26 is positioned against the outer face 48 of the distributor member 24. The first distributor flange 26 includes a pair of bores 64a and 64b through which portions of the flow nozzles 30a and 30b, respectively, extend. The second distributor flange 28 is then positioned against the first distributor flange 26 and threaded bolts 66 are used to hold the flanges 26 and 28 to the distributor member 24. The bolts 66 accomplish this by extending into threaded engagement with the threaded bores 60 shown in FIGS. 6 and 7. The molten plastic flowing through the molding tool 20 follows the paths denoted by arrows 32a and 32b through the flow nozzles 30a and 30b, respectively, in well known fashion, and is discharged from the ends 68a and 68b of the nozzles 30a and 30b, respectively.

Figure 8:
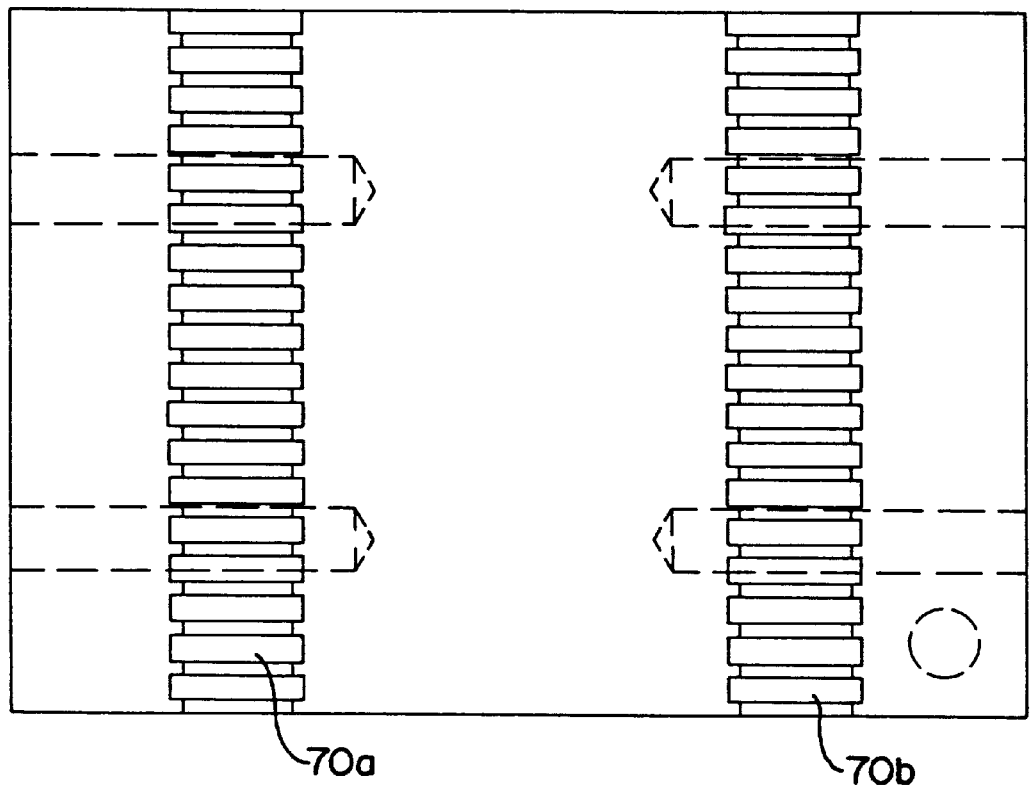
FIG. 8 is a plan view of a molding die illustrating a pair of molding cavities for use with the molding tool of the present invention.
Figure 9:
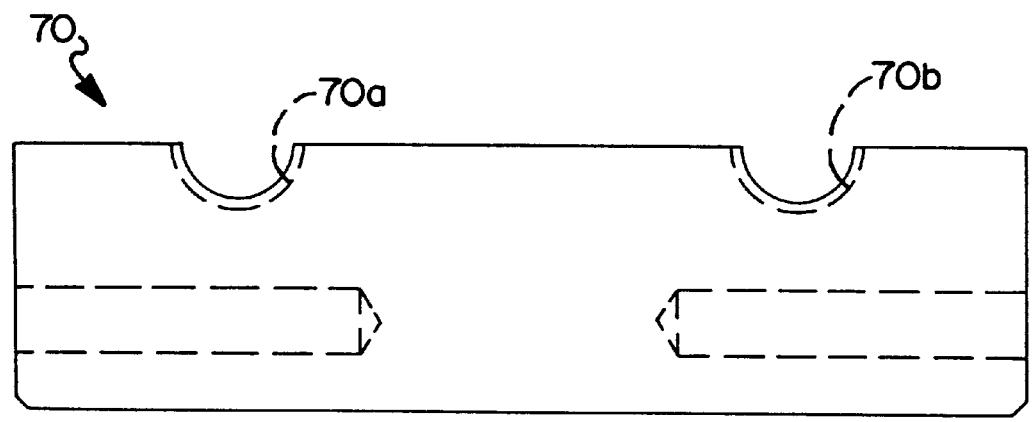
FIG. 9 is an end view of the molding die of FIG. 8 in accordance with directional arrow 9 in FIG. 8.

Referring briefly now to FIGS. 8 and 9, one-half of a molding die 70 suitable for use with the molding tool 20 is illustrated. The molding die 70 differs from conventional dies in that two independent molding cavities 70a and 70b are disposed in side-by-side relationship with one another. A plurality of threaded bores 72 permits the molding die 70 to be attached to a carrier block via a plurality of threaded bolts. It will be appreciated that for the purpose of forming continuous length lengths of tubing, a large plurality of pairs of identical molding dies 70 are incorporated and moved via a conveyor or other suitable mechanism, as is well known in the art. An example of one form of conveyor is shown in U.S. Pat. No. 4,374,079, the disclosure of which is hereby incorporated by reference. Also, it will be appreciated that dissimilar articles or articles which are similar but of different dimensions can readily be produced by the present invention 20. For example, two or more continuous lengths of tubing could be simultaneously produced with one having a diameter of 2.0" while the other has a diameter of 4.0".

With further reference to FIG. 3, in the preferred embodiments the air supply line to each flow nozzle 30a, 30b preferably comprises its own pressure gauge 72a, 72b, its own airline pressure regulator 74a, 74b and an airline filter regulator 76. This enables the airflow to each flow nozzle 30 to be precisely controlled to ensure proper dispersion of the molten plastic inside each mold cavity 70a, 70b.

By providing a molding die 70 having a pair of molding cavities 70a and 70b, a pair of continuous lengths of tubing can be formed through the use of molten plastic supplied from a single molding machine. The present invention 20 further provides the benefit of reducing the back pressure seen by the molding machine 10, which enables an increase in the flow rate through the molding tool 10. Put differently, the total flow of molten plastic out of the flow nozzles 30 is not just double that over molding tools having a single flow nozzle, but even greater than double. The molding tool 20 of the present invention has been found to increase the flow output over single flow nozzle tools by more than 100%. This means that the cavities of the molding dies being charged with molten plastic can be filled more quickly and, therefore, that the speed of the conveyor carrying the molding dies can be increased. This translates into a significant increase in efficiency.

The molding tool 20 thus forms a means which can be readily attached to most existing molding machines to divide the molten plastic output from such machines into a plurality of distinct flow paths that can be used to simultaneously charge a plurality of molding cavities, and therefore increase the throughput of the overall molding system considerably. The molding tool 20 can be retrofitted to existing molding machines with little or no modification to the output flange of most such machines. The molding tool 20 further makes use of conventional flow nozzles and permits the precise alignment of each flow nozzle as needed to insure that the molding cavities of the molding die are adequately charged with molten plastic during the molding process.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification and following claims.

What is claimed is:

1. A molding machine for simultaneously providing molten plastic to a plurality of independent molding cavities to thereby simultaneously manufacture a plurality of molded plastic articles, said apparatus comprising:

a machine for supplying molten plastic to an output port thereof;

a coupling member including a central tapered bore for receiving said molten plastic from said molding machine and transmitting said molten plastic to a distributor member, said tapered bore having a taper which increases in a diameter in a direction extending away from said output port;

a distributor member in communication with said central tapered bore of said coupling member and securable to said output port for dividing a flow of molten plastic through said output port into a plurality of independent flow paths; and a corresponding plurality of flow nozzles in communication with said independent flow paths for supplying independent quantities of said molten plastic to said plurality of independent molding cavities to thereby enable a plurality of plastic articles to be simultaneously molded.

2. The apparatus of claim 1, wherein said distributor member comprises an inner face and an outer face;

said inner face having a conical projection intermediate a plurality of fluid flow bores extending therethrough and further being generally coaxially aligned with said output port of said machine and said central bore of said coupling member for causing said molten plastic to be divided into said plurality of independent flow paths.

3. The apparatus of claim 1, wherein said distributor member comprises a plurality of threaded bores extending generally perpendicularly from said fluid flow bores;

said outer face including a plurality of recesses in communication with said fluid flow bores; and a plurality of threaded alignment bores extending generally perpendicularly from said fluid flow bores and in communication with said recesses in said outer face;

a plurality of flow nozzles at least partially disposable in said recesses and in communication with said fluid flow bores for receiving said molten plastic flowing through said fluid flow bores; and a plurality of threaded members threadably insertable into said threaded alignment bores for aligning said flow nozzles within said recesses.

4. The apparatus of claim 1, wherein:

said distributor member includes a pair of independent fluid flow bores opening into a corresponding pair of recesses, said distributor member further including a conical projection extending into said central bore of said coupling member when said distributor member is secured to said coupling member;

a corresponding plurality of flow nozzles at least partially disposed within said recesses so as to be in communication with said fluid flow bores for directing said molten plastic from said fluid flow bores to said independent molding cavities generally simultaneously; and a flange member securable to said distributor member for maintaining said flow nozzles disposed in said recesses of said distributor member.

5. The apparatus of claim 4, wherein said distributor member further comprises a plurality of threaded alignment bores extending generally perpendicularly to said fluid flow bores and communicating with said recesses; and a plurality of threaded members threadably insertable into said threaded alignment bores for maintaining said flow nozzles in desired orientations within their respective recesses.

6. The apparatus of claim 5, wherein said distributor member further comprises a plurality of bores for supplying air to said flow nozzles.

7. A molding tool securable to an output port of a molding machine for receiving molten plastic produced by said molding machine from said output port and dividing said molten plastic into a plurality of flows into independent flow paths, for simultaneously forming a plurality of independently molded plastic articles, said molding tool comprising:

a coupling member secured to said output port and having a central bore for receiving said molten plastic, said central bore having a taper which increases in a direction away from said output port;

a distributor member having an inner face and an outer face, said inner face including a plurality of spaced apart fluid bores flow extending therethrough and said outer face including a corresponding plurality of recesses in communication with said fluid flow bores, said inner face further including a portion projecting outwardly therefrom for dividing the flow of molten plastic received in said central bore of said coupling member into said fluid flow bores; and a plurality of flow nozzles at least partially disposed in said recesses of said distributor member for simultaneously receiving said plurality of flows of molten plastic and directing said plurality of flows to a mold for simultaneously forming said plurality of molded plastic articles.

8. The molding tool of claim 7, wherein said projecting portion comprises a conical projecting portion and is disposed generally coaxially with said output port of said molding machine and said central bore in said coupling member.

9. The apparatus of claim 8, wherein said coupling member is disposed intermediate said output port of said molding machine and said inner face of said distributor member.

10. The apparatus of claim 7, wherein said distributor member comprises a plurality of threaded bores extending generally perpendicularly from said fluid flow bores for receiving threaded members to enable said flow nozzles to be aligned in said recesses such that an output end of each of said flow nozzles is aligned with an input of a mold to evenly distribute said molten plastic into said mold.

11. The apparatus of claim 7, wherein said distributor member includes at least one bore in communication with each of said recesses for supplying pressurized air to an associated one of said flow nozzles.

12. The apparatus of claim 7, wherein said projecting portion operates to divide said flow of said molten plastic approximately evenly into said fluid flow bores of said distributor member.

* * * * *